No. 692,296. Patented Feb. 4, 1902.
M. C. JENKINS.
COLANDER.
(Application filed Jan. 22, 1901.)
(No Model.)
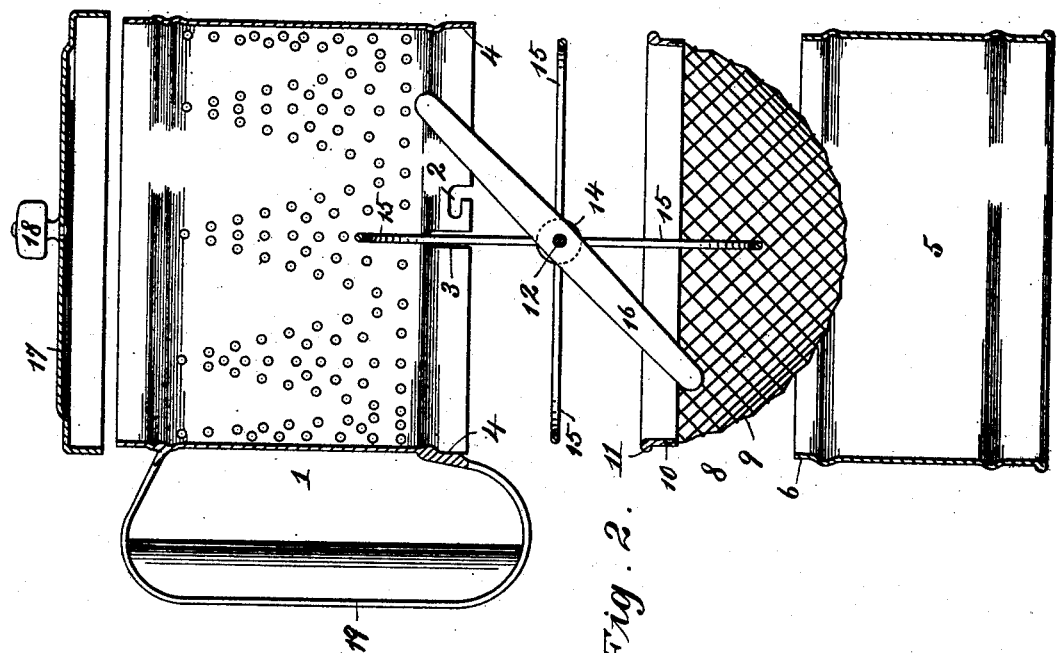
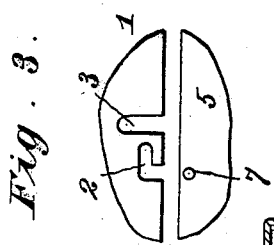
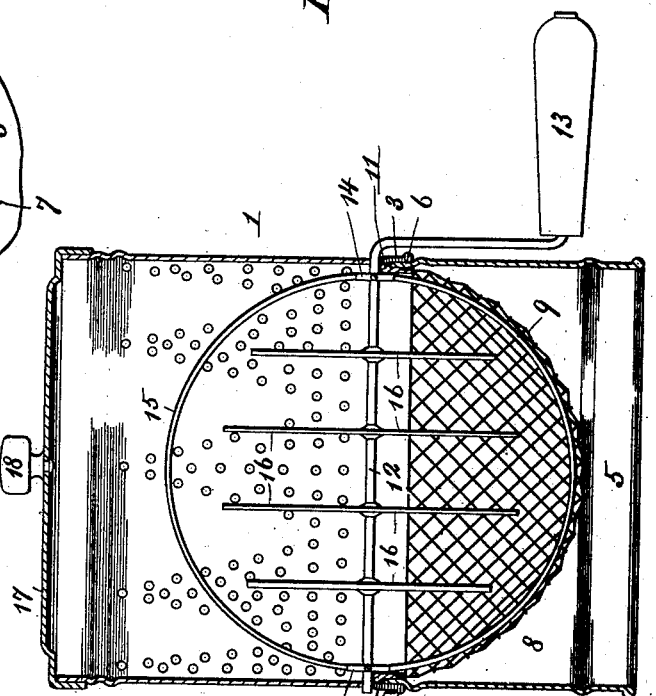
Witnesses:
H. C. Rodgers
J. W. Boling
Inventor:
Mary C. Jenkins
By Fischer & Thorpe
attys.

UNITED STATES PATENT OFFICE.

MARY C. JENKINS, OF KANSAS CITY, MISSOURI.

COLANDER.

SPECIFICATION forming part of Letters Patent No. 692,296, dated February 4, 1902.

Application filed January 22, 1901. Serial No. 44,322. (No model.)

*To all whom it may concern:*

Be it known that I, MARY C. JENKINS, a citizen of the United States, residing at Kansas City, Jackson county, Missouri, have invented a new and useful Colander, of which the following is a specification.

My invention relates to improvements in colanders; and my object is to produce a device of this character for the purpose of cutting up raw or cooked fruits and pressing out their juices preparatory to making jellies, syrups, apple-float, &c.

A further object is to so arrange the parts that they may be readily detached for cleaning after the colander has been in use.

A still further object is to provide two or three woven-wire bottoms of different mesh in order that the device may be used for several varieties of fruits.

In the accompanying drawings, Figure 1 represents a vertical sectional view of the colander, with the various parts occupying their respective positions. Fig. 2 is a vertical sectional view showing the various parts of the colander detached. Fig. 3 is a detail view showing one of the pins on the lower portion of the cylinder ready to engage one of the bayonet-slots on the upper portion of the cylinder.

In constructing my invention I employ a cylinder comprising an upper perforated portion 1, having oppositely-disposed bayonet-slots 2 and elongated slots 3, arranged at its slightly-enlarged lower end 4, and a removable lower portion 5, slightly decreased at its upper end 6 in order to snugly fit into the enlarged part of the upper portion 1 of the cylinder, where it is secured from accidental displacement by pins 7, projecting from the reduced portion 6 and adapted to interlock with bayonet-slots 2.

8 indicates a semispherical perforated bottom portion consisting, preferably, of woven wire 9, secured to an upper rim 10, having an upper peripheral flange 11, adapted to rest upon the upper edge of the lower portion 5 of the cylinder.

In practice I provide several interchangeable bottoms of different mesh, so that one may be readily substituted for another when the nature of the work requires it. Thus when operating on plums, apricots, cherries, and other fruit containing comparatively large pits or stones a coarser mesh may be employed for retaining the latter while the fruit is expelled from the colander than when treating berries, &c., containing small seed, in which instance a smaller mesh is used for separating the seed from the fruit. After the cylinder has been filled with fruit the latter is cut up and thoroughly macerated and its juices expressed through the perforated side wall of the cylinder and its gauze bottom by a rotary dasher, consisting of a transverse crank-shaft 12, provided at one end with an operating-handle 13 and removably journaled in the elongated slots 3, where it is retained by flange 11.

Shaft 12 is provided near its opposite ends with small rigidly-mounted disks 14, to which are secured a suitable number of semicircular loops 15. Said shaft is also provided with a plurality of equally-spaced knives 16, rounded and tapering at their opposite ends and rigidly secured at their central portions to the shaft. They are also graduated in length to conform to the shape of the bottom portion 8.

17 indicates a cover adapted to snugly fit over the top of the cylinder for the purpose of preventing the rotating dasher from spattering the fruit out of the upper portion of the colander. It is fitted with a centrally-located knob 18 for convenience in placing it on or removing it from the top of the cylinder.

The upper side portion of the colander is provided with an integral handle 19, which extends at right angles from the dasher 13, so it may be grasped with the left hand while the dasher is operated by the right hand.

In practice the colander may be held over or placed in a pan or other receptacle provided to receive the macerated fruit and expressed juices therefrom.

After the colander has been used the cylinder, dasher, and wire bottom are taken apart, so they can be more readily and thoroughly cleaned.

In addition to the colander being employed for the purposes above described it may also be used for treating a large variety of vegetables, and by removing the dasher it will serve the purpose of an ordinary strainer.

From the above description it will be apparent that I have produced a utensil that is well adapted for the variety of uses intended.

Having thus described the invention, what I claim as new, and desire to secure by Letters Patent, is—

A colander, consisting of a cylinder, a semispherical woven-wire bottom portion, a crank-shaft transversely journaled in the cylinder, a plurality of semicircular loops secured at their opposite terminals to said crank-shaft, and a series of knives also secured to said shaft and graduated in length to conform to the semispherical bottom portion, substantially as described.

In testimony whereof I affix my signature in the presence of two witnesses.

MARY C. JENKINS.

Witnesses:
F. G. FISCHER,
J. W. BOLING.